United States Patent [19]
Chan et al.

[11] Patent Number: 6,066,900
[45] Date of Patent: May 23, 2000

[54] COMPUTER SYSTEM WITH MULTIPLE SWITCHABLE POWER ZONES

[75] Inventors: Chen Hsiang Chan; Tung Huei-Guo; Kuo Hung-Yi, all of San-Chung, Taiwan

[73] Assignee: Nexcom International Co. Ltd., Taipei Hsien, Taiwan

[21] Appl. No.: 09/033,779

[22] Filed: Mar. 2, 1998

[51] Int. Cl.[7] ........................................ H02J 1/00
[52] U.S. Cl. ........................ 307/38; 307/31; 364/528.21
[58] Field of Search ............................... 307/31, 38, 39; 395/750.01–750.08; 364/528.21

[56] References Cited

U.S. PATENT DOCUMENTS

| | | | |
|---|---|---|---|
| 5,378,930 | 1/1995 | Kuchenreuther | 307/38 |
| 5,390,081 | 2/1995 | St. Pierre | 361/775 |
| 5,572,685 | 11/1996 | Fisher | 395/287 |
| 5,650,939 | 7/1997 | Yoshida | 364/492 |
| 5,831,346 | 11/1998 | Baumann | 307/64 |
| 5,832,286 | 11/1998 | Yoshida | 395/750.06 |

*Primary Examiner*—Fritz Fleming
*Assistant Examiner*—Ed Garlepp

[57] ABSTRACT

The present invention provides a computer system having a backplane with a plurality of subsystems which can be individually switched on or off. The computer system comprises a backplane having a plurality of power zones, a power control circuit installed in the backplane for each of the power zones for controlling electric power supplied to the power zone from a power supply, and a subsystem installed in each of the power zones, each of the subsystems comprising an I/O (input/output) bus, at least one I/O slot connected to the I/O bus for connecting an I/O device, and a processor connected to the I/O bus for controlling operations of the subsystem. Each of the subsystems can be switched on or off by using the power control circuit of the power zone of the subsystem.

8 Claims, 3 Drawing Sheets

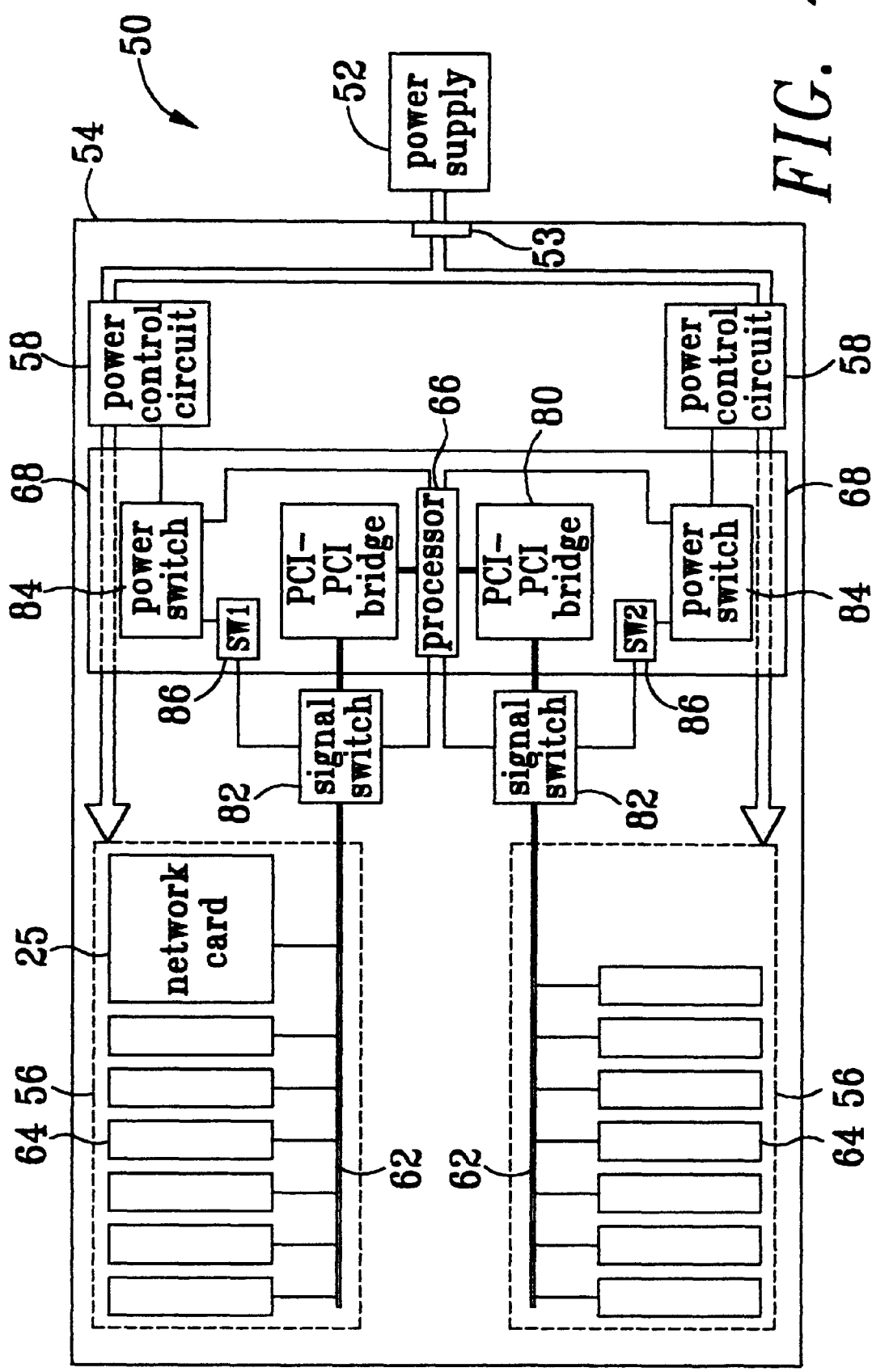

COMPUTER SYSTEM WITH MULTIPLE SWITCHABLE POWER ZONES

BACKGROUND OF THE INVENTION

1. Field of the Invention

The present invention relates to a computer system, and more particularly, to a computer system with multiple switchable power zones.

2. Description of the Prior Art

The backplane of a prior art computer system such as a file server or an application server contains only one power zone for supplying power to the backplane and all the components connected to the backplane. If a component connected to the backplane such as an I/O card or a disk drive is malfunctioned and needs to be replaced, the backplane will have to be completely turned off which is not acceptable for non-stop computer systems.

SUMMARY OF THE INVENTION

It is therefore a primary objective of the present invention to provide a computer system having a backplane with a plurality of separately controlled power zones to solve the above mentioned problem.

In a preferred embodiment, the present invention provides a computer system comprising:

a backplane having a plurality of power zones;

a power control circuit installed in the backplane for each of the power zones for controlling electric power supplied to the power zone from a power supply;

a subsystem installed in each of the power zones, each of the subsystems comprising an I/O (input/output) bus, at least one I/O slot connected to the I/O bus for connecting an I/O device, and a processor connected to the I/O bus for controlling operations of the subsystem; and a multiprocessor operating system executed over the processors of the subsystems for assigning tasks to each of the subsystems for execution, and transferring tasks assigned to one of the subsystems to other subsystem before the subsystem is switched off;

wherein each of the subsystems can be switched on or off by using the power control circuit of the power zone of the subsystem.

It is an advantage of the present invention that the computer system comprises a plurality of separately controlled power zones. If a power zone has to be switched off, its tasks can be transferred to another power zone for execution.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 4 is a block diagram of another computer system according to the present invention.

DETAILED DESCRIPTION OF THE PREFERRED EMBODIMENT

Figure 1:
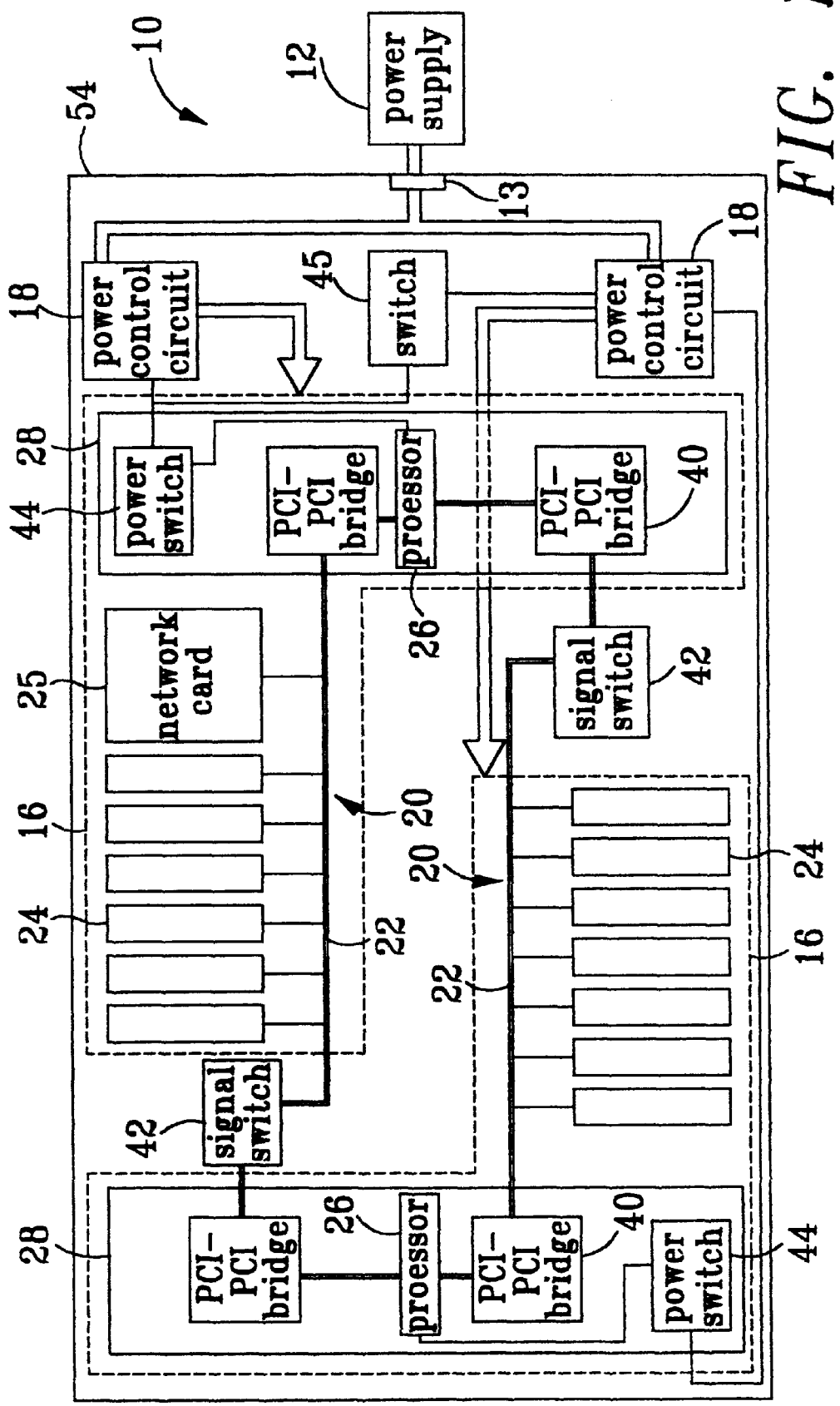
FIG. 1 is a block diagram of a computer system according to the present invention.
Figure 2:
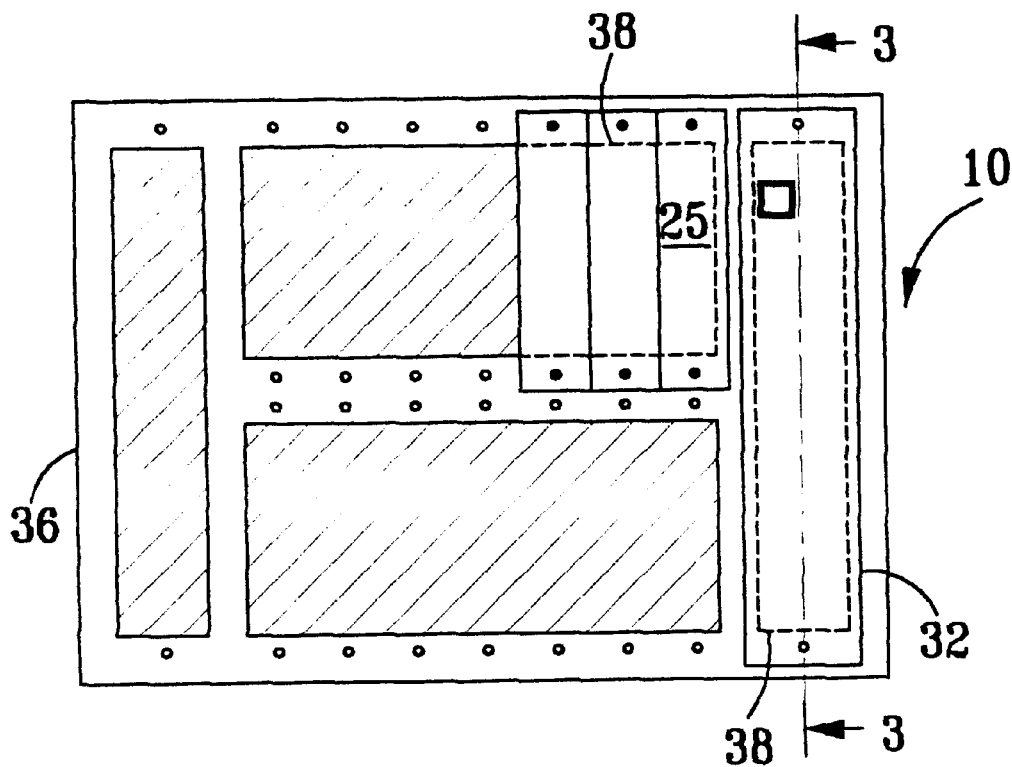
FIG. 2 is a front view of the computer system shown in FIG. 1.
Figure 3:
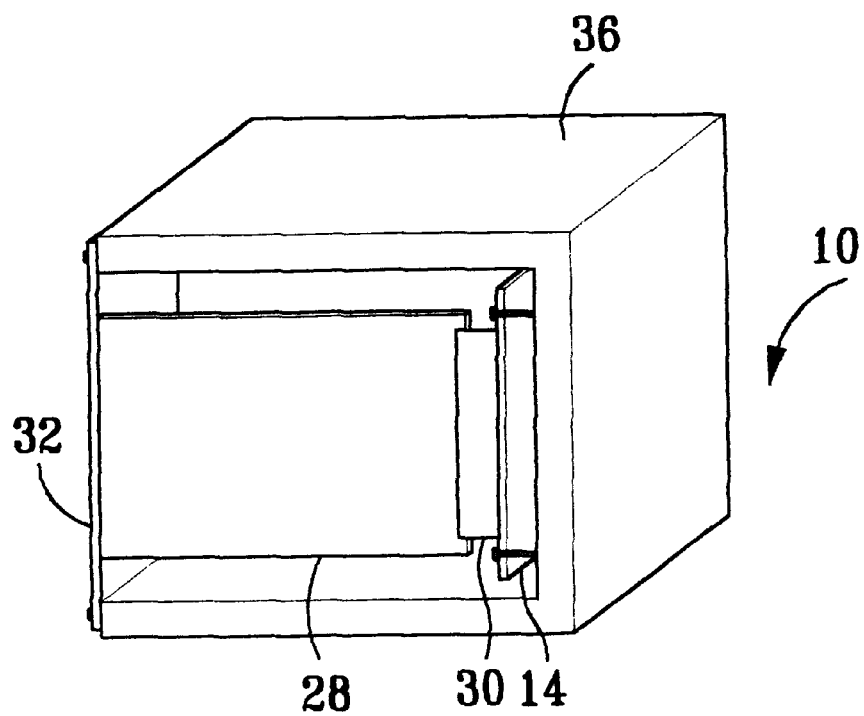
FIG. 3 is a sectional view along line 3—3 of the computer system shown in FIG. 2.

Please refer to FIGS. 1 to 3. FIG. 1 is a block diagram of a computer system 10 according to the present invention. FIG. 2 is a front view of the computer system 10. FIG. 3 is a sectional view along line 3—3 of the computer system 10. The computer system 10 comprises a power supply 12, a backplane 14 having two power zones 16 installed in the backplane 14, and a control system which is a multiprocessor operating system such as Microsoft Windows NT 5.0 or SCO UNIX 5.0 executed in the two subsystems 20 for controlling operations of the computer system 10. Each power zone 16 comprises a subsystem 20 installed in it.

The system 10 further comprises a connector 13 and two power control circuits 18 installed in the backplane 14, and two processor cards 28 attached to the backplane 14. The connector 13 is used for connecting an external power supply 12. Each power control circuit 18 is connected between one power zone 16 and the connector 13 for controlling the electric power supplied to the power zone 16. Each subsystem 20 comprises an I/O (input/ output) bus 22, seven I/O slots 24 connected to the I/O bus 22 for connecting various I/O devices such as a network card 25, and a processor 26 connected to the I/O bus 22 for controlling operations of the subsystem 20. The I/O bus 22 is a PCI bus, and the processor card 28 comprises a PCI—PCI bridge 40 for controlling the PCI bus 22. The multiprocessor operating system is executed over the processors 26 of the two subsystems 20 for controlling operations of the system 10 and assigning tasks to each of the subsystems 20 for execution. Each subsystem 20 in a power zone 16 can be switched on or off by using the power control circuit 18 of the power zone 16. If a power zone 16 has to be switched off, the tasks assigned to the subsystem 20 in the power zone 16 will be transferred to the other subsystem 20 of the other power zone 16 by the multiprocessor operating system.

The processor 26 of each subsystem 20 can be directly installed on the backplane 14 and connected with the power control circuit 18 of the power zone 16 so that the processor 26 can use the power control circuit 18 to switch on or off the power supplied to the power zone 16. The processor 26 of each subsystem 20 can also be installed on a processor card 28 which can be plugged into a processor slot 30. The processor card 28 comprises a user interface 32 having a power switch 44 installed on it and connected to the power control circuit 18 of the power zone 16 for turning on or off the power control circuit 18 to control the power supplied to the power zone 16. The power control circuit 18 of the power zone 16 is also connected to the processor 26 so that the processor 26 can use the power control circuit 18 to turn on or off the power supplied to the power zone 16.

The backplane 14 further comprises two signal switches 42 and one switch 45 installed on it. Each signal switch 42 is connected between the processor 26 of one subsystem 20 and the I/O bus 22 of another subsystem 20 for controlling signal transmission therein. The switch 45 is used for connecting the power switch 44 of one subsystem 20 and the power control circuit 18 of another subsystem 20. The signal switches 42 and the switch 45 are all manual switches. If the processor card 28 of the subsystem 20 at the left side of the backplane 14 is not plugged into the processor slot 30, the signal switch 42 at the right side of the backplane 14 can be switched on so that the processor 26 of the right side subsystem 20 can control the I/O bus 22 of the left side subsystem 20 at the same time, and the power switch 44 can control the power supplied to both of the power zones 16.

The computer system 10 comprises a rack mount chassis 36 having a plurality of openings 38 in its front end. The backplane 14 is installed inside the chassis 36 behind the openings 38. The processor card 28 is mounted in one opening 38 of the rack mount chassis 36 and plugged in the processor slot 30 on the backplane 14. The I/O device such as the network card 25 is also mounted to one of the openings 38 and plugged in one I/O slot 24 of the backplane 14.

Please refer to FIG. 4. FIG. 4 is a block diagram of an alternative computer system 50 according to the present invention. The computer system 50 comprises an external power supply 52, a backplane 54 having two power zones 56 in it, a processor 66, and a control system which is an operating system executed in the processor 66 for controlling operations of the computer system 50.

The backplane 54 further comprises a connector 53 installed in the backplane 54 for connecting the power supply 52, and two power control circuits 58 each connected between one of the two power zones 56 and the connector 53 for controlling the power supplied to the power zone 56. Each power zone 56 comprises an I/O bus 62, and seven I/O slots 64 connected to the I/O bus 62 for connecting I/O devices such as the network card 25. The processor 66 is connected to the I/O bus 62 of each power zone 56 for controlling operations of I/O devices connected to the I/O bus 62. The I/O buses 62 of the two power zones 56 are both PCI buses, and the processor card 68 comprises two PCI—PCI bridges 80 for controlling the two PCI buses separately. Each power zone 56 has a power switch 84 and a signal switch 82. The power switch 84 of one power zone 56 is connected to the power control circuit 58 of the power zone 56 for turning on or off the power control circuit 58 so as to control the power supplied to the power zone 56. The signal switch 82 of one power zone 56 is connected between the processor 66 and the I/O bus 62 of the power zone 56 for controlling signal transmission to the I/O bus 62. Each power zone 56 can be switched on or off by using its power switch 84 and signal switch 82. The operating system of the computer system 50 can assign tasks to the I/O devices connected to the I/O bus 62 of each power zone 56. Before turning off a power zone 56, the operating system of the computer system 50 will transfer the tasks assigned to the I/O devices of the power zone 56 to the I/O devices of another power zone 56 so that the computer system 50 can keep on running.

The processor 66 is installed on a processor card 68 which is plugged in a processor slot of the backplane 54 similar to the processor slot 30 shown in FIG. 3. The processor card 68 comprises a user interface (not shown) having two switches 86 installed on it. Each switch 86 is connected to the power switch 84 and the signal switch 82 of one power zone 56 for turning on or off the power zone 56. The power switch 84 and the signal switch 82 of each power zone 56 are also connected to the processor 66 so that the processor 66 can turn on or off each power zone 56. The rack mount chassis 36 shown in FIG. 2 can be used in the computer system 50 for mounting the backplane 54, processor card 68 and network card 25 in the same manner.

Those skilled in the art will readily observe that numerous modifications and alternations of the device may be made while retaining the teachings of the invention. Accordingly, the above disclosure should be construed as limited only by the metes and bounds of the appended claims.

What is claimed is:

1. A computer system comprising:
   a backplane having a plurality of power zones;
   a plurality of subsystems installed in the corresponding power zones, each of the subsystems comprising an I/O (input/output) bus, at least one I/O slot connected to the I/O bus for connecting an I/O device, and a processor connected to the I/O bus for controlling operations of the subsystem; and
   a plurality of power control circuits installed in the backplane for the corresponding power zones for controlling electric power supplied to the power zones from a power supply;
   wherein each of the subsystems can be switched on or off by using the power control circuit of the power zone of the subsystem, at least one subsystem comprises a processor slot installed in its power zone, and the processor of the subsystem is installed on a processor card which is plugged in the processor slot of the subsystem; and
   wherein the backplane further comprises a signal switch connected between the processor of the subsystem and the I/O bus of another subsystem, and a power switch connected between the processor of the subsystem and the power control circuit of another subsystem, wherein if the processor card of another subsystem is not installed on its processor slot, the signal switch and the power switch can be switched on so that the processor of the subsystem can control the I/O bus of another subsystem.

2. The computer system of claim 1 further comprising a multiprocessor operating system executed over the processors of the subsystems for assigning tasks to each of the subsystems for execution, and transferring tasks assigned to one of the subsystems to another subsystem before the subsystem is switched off.

3. The computer system of claim 1 wherein the processor card comprises a user interface and a power switch installed on the user interface and electrically connected to the power control circuit of the power zone to control the power supplied to the power zone.

4. The computer system of claim 1 wherein the power control circuit of the power zone is connected to the processor card so that the processor installed on the processor card can use the power control circuit to control the power supplied to the power zone.

5. The computer system of claim 1 further comprising a rack mount chassis having a front end with a plurality of openings in it wherein the backplane is installed inside the rack mount chassis behind the front openings and the processor card is mounted in one of the front openings and plugged in the processor card of the backplane.

6. The computer system of claim 5 wherein the I/O device is an I/O card mounted in one of the front openings and plugged in the I/O slot of the backplane.

7. The computer system of claim 1 wherein the I/O bus is a PCI bus and the processor card further comprises a PCI—PCI bridge for controlling the PCI bus.

8. The computer system of claim 1 wherein the I/O bus of another subsystem is a PCI bus and the processor card further comprises a PCI—PCI bridge for controlling the PCI bus.

* * * * *